(12) United States Patent
Hong et al.

(10) Patent No.: US 7,807,092 B2
(45) Date of Patent: *Oct. 5, 2010

(54) CERAMIC NANOCOMPOSITE POWDERS REINFORCED WITH CARBON NANOTUBES AND THEIR FABRICATION PROCESS

(75) Inventors: Soon Hyung Hong, Daejeon (KR); Seung Il Cha, Daejeon (KR); Kyung Tae Kim, Daejeon (KR); Kyong Ho Lee, Daejeon (KR); Chan Bin Mo, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 419 days.

This patent is subject to a terminal disclaimer.

(21) Appl. No.: 10/780,863

(22) Filed: Feb. 19, 2004

(65) Prior Publication Data

US 2004/0217520 A1 Nov. 4, 2004

(30) Foreign Application Priority Data

Feb. 25, 2003 (KR) .................. 10-2003-0011815

(51) Int. Cl.
*B06B 1/02* (2006.01)
*C04B 35/64* (2006.01)
*C04B 35/52* (2006.01)

(52) U.S. Cl. .................. 264/442; 264/640; 264/641

(58) Field of Classification Search .................. 264/441, 264/640, 641
See application file for complete search history.

(56) References Cited

U.S. PATENT DOCUMENTS 5,627,140 A 5/1997 Fossheim et al.
6,299,812 B1 10/2001 Newman et al.
6,346,136 B1 2/2002 Chen et al.
6,420,293 B1* 7/2002 Chang et al. .................. 501/95.2
6,858,173 B2* 2/2005 Zhan et al. .................. 264/430
7,217,311 B2* 5/2007 Hong et al. .................. 75/345
2003/0181328 A1 9/2003 Hwang et al.
2004/0167009 A1* 8/2004 Kuntz et al. .................. 501/95.2

OTHER PUBLICATIONS

Hwang, G.L., Hwang, K.C., "Carbon nanotube reinforced ceramics", J. Mater. Chem., 2001, 11, 1722-1725.*

Ning, J., Zhang, J., Pan, Y., Guo, J., "Fabrication and mechanical properties of SiO2 matrix composites reinforced by carbon nanotube", Materials Science and Engineering A357 (2003) 392-396.*

Ning, J. Zhang, J. Pan, Y. Guo, J., "Fabrication and thermal property of carbon nanotube/SiO2 composites", Journal of Materials Science Letters 22, 2003, 1019-1021.*

Smalley et. al., "The role of surfactant adsorption during ultrasonication in the dispersion of single-walled carbon nanotubes", J. Nanosci. Nanotech. 2003, v3(1), (2003), p. 81-86.*

(Continued)

Primary Examiner—Jason L. Lazorcik
(74) Attorney, Agent, or Firm—Sterne, Kessler, Goldstein & Fox P.L.L.C.

(57) ABSTRACT

The invention relates to methods for fabricating ceramic nanocomposite powders, comprising a ceramic matrix and carbon nanotubes homogeneously dispersed in the ceramic matrix. The ceramic nanocomposite powders of the invention can prevent property deterioration due to agglomeration of carbon nanotubes.

6 Claims, 5 Drawing Sheets

OTHER PUBLICATIONS

Laurent, C., et al., "Carbon Nanotubes-Fe-Alumina Nanocomposites. Part II: Microstructure and Mechanical Properties of the Hot-Pressed Composites," *J. Eur. Ceram. Soc. 18*:2005-2013, Elsevier Science Ltd. (1998).

Peigney, A., et al., "Carbon nanotubes in novel ceramic matrix nanocomposites," *Ceram. Int. 26*:677-683, Elsevier (2000).

Siegel, R.W., et al., "Mechanical behavior of polymer and ceramic matrix nanocomposites," *Scripta Mater. 44*:2061-2064, Pergamon Press (2001).

Xu, C.L., et al., "Fabrication of aluminum-carbon nanotube composites and their electrical properties," *Carbon 37*:855-858, Pergamon Press (1999).

Co-pending U.S. Appl. No. 10/799,923, inventors, Hong, S.H., et al., filed Mar. 15, 2004 (Not Published).

Dong, S.R., et al., "An investigation of the sliding wear behavior of Cu-matrix composite reinforced by carbon nanotubes," *Mater. Sci. Eng. A313*:83-87, Elsevier Science B.V. (2001).

Flahaut, E., et al., "Carbon Nanotube-Metal-Oxide Nanocomposites: Microstructure, Electrical Conductivity and Mechanical Properties," *Acta Mater. 48*:3803-3812, Elsevier Science Ltd. (2000).

Bian, Z., et al., "Excellent Wave Absorption by Zirconium-Based Bulk Metallic Glass Composites Containing Carbon Nanotubes," *Adv. Mater. 15*:616-621 Wiley-VCH Verlag GmbH & Co. (2003).

Bian, Z., et al., "Excellent Ultrasonic Absorption Ability of Carbon-Nanotube-Reinforced Bulk Metallic Glass Composites," *Appl. Physics Let. 82*:2790-2792 American Institute of Physics (2003).

Chen, X., et al., "Carbon Nanotube Composite Deposits with High Hardness and High Wear Resistance," *Adv. Eng. Mater. 5*:514-518 Wiley-VCH Verlag GmbH & Co. (2003).

Derwent Acc. No. 2004-239902, English language abstract of Chinese patent CN 1465729 A; filed Jun. 6, 2002 and published Jan. 7, 2004.

Vincent, P., et al., "Inclusion of Carbon Nanotubes in a TiO$_2$ Sol-Gel Matrix," *J Non-Crystalline Solids 311*:130-137 Elsevier Science B.V. (2002).

Cha, S. I., et al., "Extraordinary Strengthening Effect of Carbon Nanotubes in Metal-Matrix Nanocomposites Processed by Molecular-Level Mixing," *Advanced Materials 17*:1377-1381 (2005).

Cha, S. I., et al., "Strengthening and Toughening of Carbon Nanotube Reinforced Alumina Nanocomposite Fabricated by Molecular Level Mixing Process," *Scripta Materialia 53*:793-797 (2005).

* cited by examiner

CERAMIC NANOCOMPOSITE POWDERS REINFORCED WITH CARBON NANOTUBES AND THEIR FABRICATION PROCESS

This application claims priority to Korean Patent Application No. 10-2003-0011815, filed Feb. 25, 2003, which is incorporated by reference herein in its entirety.

BACKGROUND OF THE INVENTION

1. Field of the Invention

The present invention relates to ceramic nanocomposite powders reinforced with carbon nanotubes, and more particularly to a fabrication process of ceramic nanocomposite powders in which carbon nanotubes are homogeneously distributed in a ceramic matrix without agglomeration of the carbon nanotubes.

2. Related Art

Currently, some researchers have reported fabrication techniques of ceramic composite materials reinforced with carbon nanotubes. For example, in order to improve hardness and fracture toughness of ceramic composite materials, Laurent, C., et al., *J. Eur. Ceram. Soc.* 18:2005-2013 (1998), Peigney, A., et al., *Ceram. Int.* 26:677-685 (2000) and Siegel, R. W., et al., *Scripta Mater.* 44:2061-2064 (2001), developed methods for fabricating carbon nanotubes-Fe-alumina or carbon nanotubes-SiC-alumina composite materials having a weight fraction of carbon nanotubes of 2-15% using a hot pressing process or conventional sintering process.

However, since they employed a simple powder-powder blending method for mixing of carbon nanotubes and ceramic matrix powders to fabricate composite materials, it was difficult to further improve the characteristics of the composite materials to a desirable level. That is, a simple blending of powders for the fabrication of composite materials cannot eliminate factors negatively affecting characteristics of the composite materials such as high porosity, low relative density, etc., resulting from agglomeration of carbon nanotubes, etc. This was because the dispersibility of the carbon nanotubes was not sufficiently taken into consideration during fabrication of the ceramic composite materials.

Therefore, the carbon nanotubes in matrix materials should be dispersed, and this microstructural shape influences the characteristics and sinterability of final ceramic nanocomposite powders to be fabricated. Accordingly, since the improvement in the dispersibility of the carbon nanotubes leads to sound-state composite powders, conventional techniques do not permit the fabrication of composite powders with excellent characteristics. The term 'sound-state' used herein refers to the state in which carbon nanotubes are homogeneously dispersed not only on the surface but also in the interior of a ceramic matrix.

SUMMARY OF THE INVENTION

It is an object of the present invention to provide a method for fabricating ceramic nanocomposite powders which includes a ceramic matrix and carbon nanotubes homogeneously dispersed in the matrix, thereby preventing agglomeration of the carbon nanotubes.

In order to accomplish the above object of the present invention, there is provided a method for fabricating ceramic nanocomposite powder, said method comprising: (a) dispersing carbon nanotubes in a dispersion medium, (b) sonicating the dispersion, (c) dispersing a water-soluble salt in the sonicated dispersion of (b), (d) sonicating the dispersion of (c), and (e) drying and calcinating the sonicated dispersion of (d), wherein the water-soluble salt forms a ceramic matrix post-calcination, thereby fabricating ceramic nanocomposite powder, wherein the carbon nanotubes are homogeneously dispersed in the ceramic matrix.

In some embodiments, the dispersion medium in (a) is selected from the group consisting of water, ethanol, nitric acid solution, toluene, N,N-dimethylformamide, dichlorocarbene and thionyl chloride. In some embodiments, the water-soluble salt, mixed with the carbon nanotubes, includes metal-based salts capable of being formed into a ceramic matrix after the calcination process. In some embodiments, the ceramic matrix is selected from the group consisting of aluminum oxides, copper oxides, cobalt oxides, nickel oxides, zinc oxides, tungsten oxides and silicon oxides.

In the present invention, the drying can be carried out at 80-100° C. In some embodiments, when the ceramic matrix requires a calcination temperature of 400° C. or lower, the calcination is carried out in air at 300-350° C. In some embodiments, when the ceramic matrix requires a calcination temperature of 400° C. or higher, the calcination is carried out under high vacuum at a temperature of 400-1,700° C. In some embodiments, when the ceramic matrix requires a calcination temperature of 400° C. or lower, it is further dried at 300-350° C.

In the present invention, ceramic nanocomposite powder comprising a matrix, and carbon nanotubes homogeneously dispersed in the matrix, are fabricated in accordance with the method described herein.

DETAILED DESCRIPTION OF THE INVENTION

Figure 1:
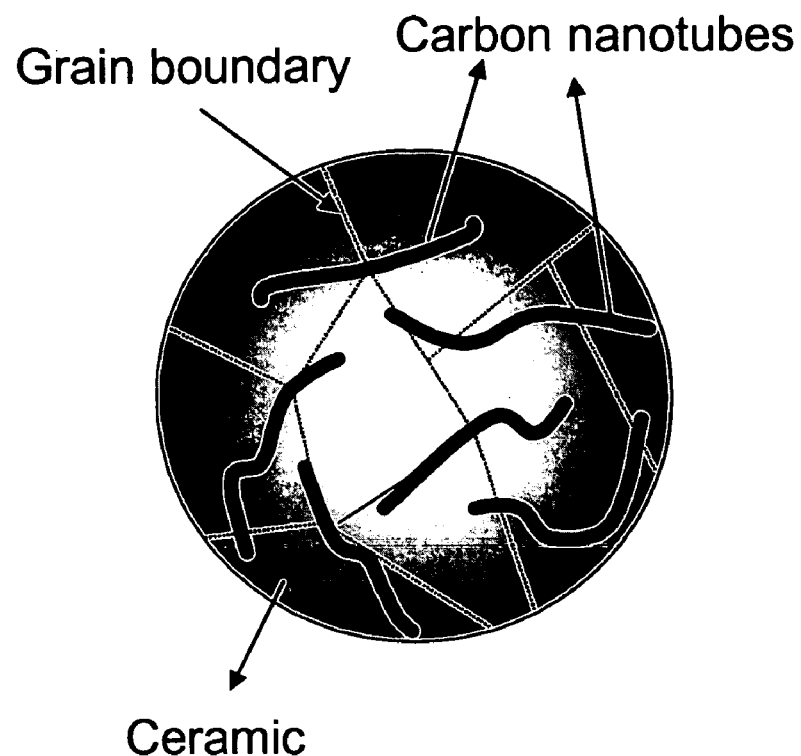
FIG. 1 is a diagram showing a ceramic nanocomposite powder fabricated by a method according to the present invention.

Generally, a carbon nanotube has strength of the order of 30 GPa and elastic modulus of the order of 1 TPa. The carbon nanotubes usable in the present invention include, but are not limited to, those having a relatively high aspect ratio, and preferably an aspect ratio of 10:1-1,000:1. In addition, the carbon nanotubes usable in the present invention can have a purity of 95% or higher. In one embodiment of the present invention, tubular carbon nanotubes having a diameter of about 10-40 nm and a length of 5 μm can be used. The tubular carbon nanotubes can be used as a reinforcement in ceramic composite materials.

In order to separate a bundle of carbon nanotubes into individual tubes, the carbon nanotubes are dispersed in an appropriate dispersion medium. So long as the dispersion medium can functionalize the carbon nanotubes, any type of solution and solvent can be used. The term 'functionalize' as used herein refers to the state that functional groups are formed around the periphery of the carbon nanotubes in the dispersion medium. Examples of the dispersion medium for dispersing the carbon nanotubes include, but are not limited to, water, ethanol, nitric acid solution, toluene, N,N-dimethylformamide, dichlorocarbene, thionyl chloride, etc. Water, ethanol and nitric acid solution have simple properties and excellent dispersibility due to formation of electrostatic charges and carboxylation on the surface of the carbon nanotubes.

Sonication is carried out to promote dispersion of carbon nanotubes in the dispersion medium. Sonication is typically carried out at 40-60 kHz, for 2-4 hours. Common ultrasonic cleaning systems can be used, e.g. a Model 08893-16 (Cole-Parmer, Vernon Hills, Ill.).

So long as metal based salts are changed into ceramic materials and are reinforced with the carbon nanotubes after a calcination process, any ceramic materials can be used as the matrix material. The matrix material usable in the present invention includes, but are not limited to, all metal-based salts capable of being formed into a ceramic matrix post calcination. Examples of metal-based salts include aluminum hydroxides, water-soluble copper salts, cobalt salts, tin salts, chromium salts, magnesium salts, tungsten salts, silicon salts and the like.

After the addition of the water-soluble metal-based salts to the sonicated dispersion, a second sonication is carried out. The second sonication is carried out under conditions substantially similar to the first sonication. The second sonication can be carried out at 40-60 kHz for 10 hours. If the second sonication is carried out for more than 10 hours, defects on the surface of the carbon nanotubes can be generated. Defect means that the well-aligned graphite structure is destroyed on the surface of the carbon nanotubes. The sonication treatments are carried out to homogeneously disperse the carbon nanotubes and the water-soluble salt in the dispersion medium, and to induce the formation of chemical bonds between the carbon nanotubes and the matrix at the molecular level.

Drying and calcination are carried out in an atmosphere that does not damage the carbon nanotubes, e.g., under vacuum, hydrogen gas, or an inert gas atmosphere such as argon or nitrogen gas. The calcination conditions are varied depending on the kinds of final ceramic matrix material used. In order to fabricate ceramic nanocomposite powders reinforced with carbon nanotubes, the drying and calcination can occur under the following conditions.

Carbon nanotubes exhibit a tendency to be oxidized in air at 400° C. or more and thus disappear. Accordingly, the drying step can be carried out at 80-100° C., at which water contained in the dispersion medium is completely removed. In addition, the drying step can be carried out for 6-12 hours. Under these conditions, oxygen and air are sufficiently provided to substantially remove impurities, e.g., water and organic solvents.

The conditions for calcination also depend on the kinds of matrix materials used. For example, in the case of a ceramic matrix material requiring a calcination temperature of 400° C. or lower, calcination can be carried out in air at 300-350° C. to prevent damage to the carbon nanotubes. At a temperature of 350° C. or lower, impurities, e.g., organic solvents, contained in the matrix powders can be removed and stable oxides are formed. When the temperature is lower than 300° C., there is a risk of incomplete removal of the organic solvents. In addition, calcination can be carried out in the range of about 2-4 hours to form a stable oxide ceramic phase. In the case of a matrix material requiring a calcination temperature of 400° C. or higher, the calcination can be carried out under vacuum condition ($10^{-1}$ torr) to prevent damage of the carbon nanotubes by the combination of high temperatures and air. In addition, the calcination can be carried out at a temperature of 400-1,700° C. At this temperature range, a stable ceramic state can be formed. When the temperature is higher than 1,700° C., there is a risk of damage to the carbon nanotubes even by a small amount of oxygen. Accordingly, the matrix material requiring a calcination temperature of 400° C. or higher can be calcinated at a temperature of 1,700° C. or lower. In order to form a stable oxide ceramic phase, the matrix material requiring a calcination temperature of 400° C. or higher is first dried at 80-100° C. for 6-12 hours and further dried at 300-350° C. for 6-12 hours to provide the matrix powders with a sufficient amount of oxygen. These calcination conditions make it possible to form a stable oxide ceramic phase.

In some aspects of the present invention, composite powders can be fabricated from ceramic matrix materials such as aluminum oxide, having a calcination temperature of 400° C. or higher, and copper oxide, having a calcination temperature of 400° C. or lower.

Gases such as hydrogen gas, water vapor and nitrogen can be removed by drying, and stable ceramic powders can be fabricated by calcination. Thus, ceramic nanocomposite powders reinforced with carbon nanotubes of the present invention are fabricated.

Figure 2:
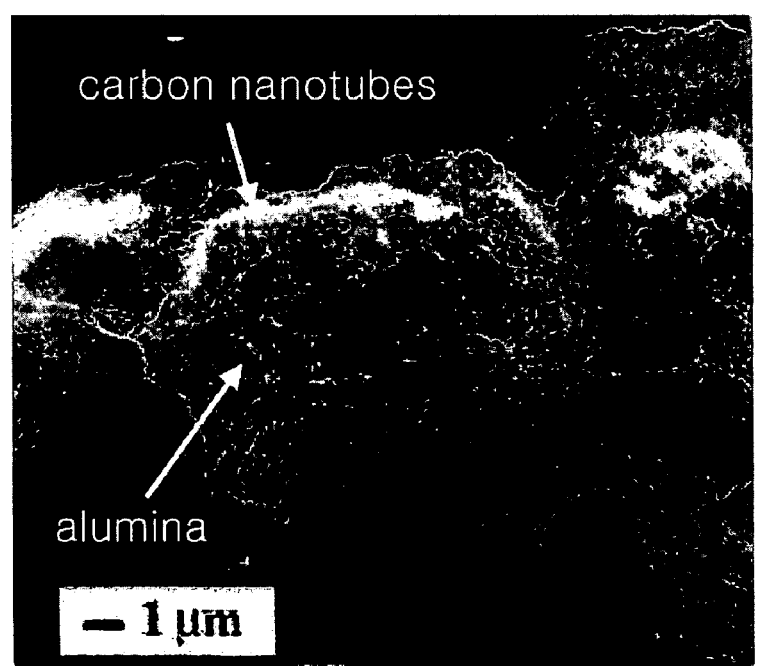
FIG. 2 is a scanning electron microscope (SEM) image of composite powders fabricated in accordance with a conventional method for fabricating ceramic nanocomposite powders.

In the carbon nanotube-reinforced ceramic nanocomposite powders thus fabricated, the carbon nanotubes are homogeneously dispersed in the matrix. An example of the carbon nanotube-reinforced ceramic nanocomposite powders is schematically shown in FIG. 1. The homogeneous dispersion of the carbon nanotubes in the matrix prevents the surface of the matrix powders from being covered with carbon nanotubes, and thus improves the sinterability of the matrix powders during the consolidation process. In a conventional method for fabricating ceramic nanocomposite powders, the surface of matrix powders is covered with the carbon nanotubes. An SEM image of the conventional composite powders is shown in FIG. 2.

Figure 3:
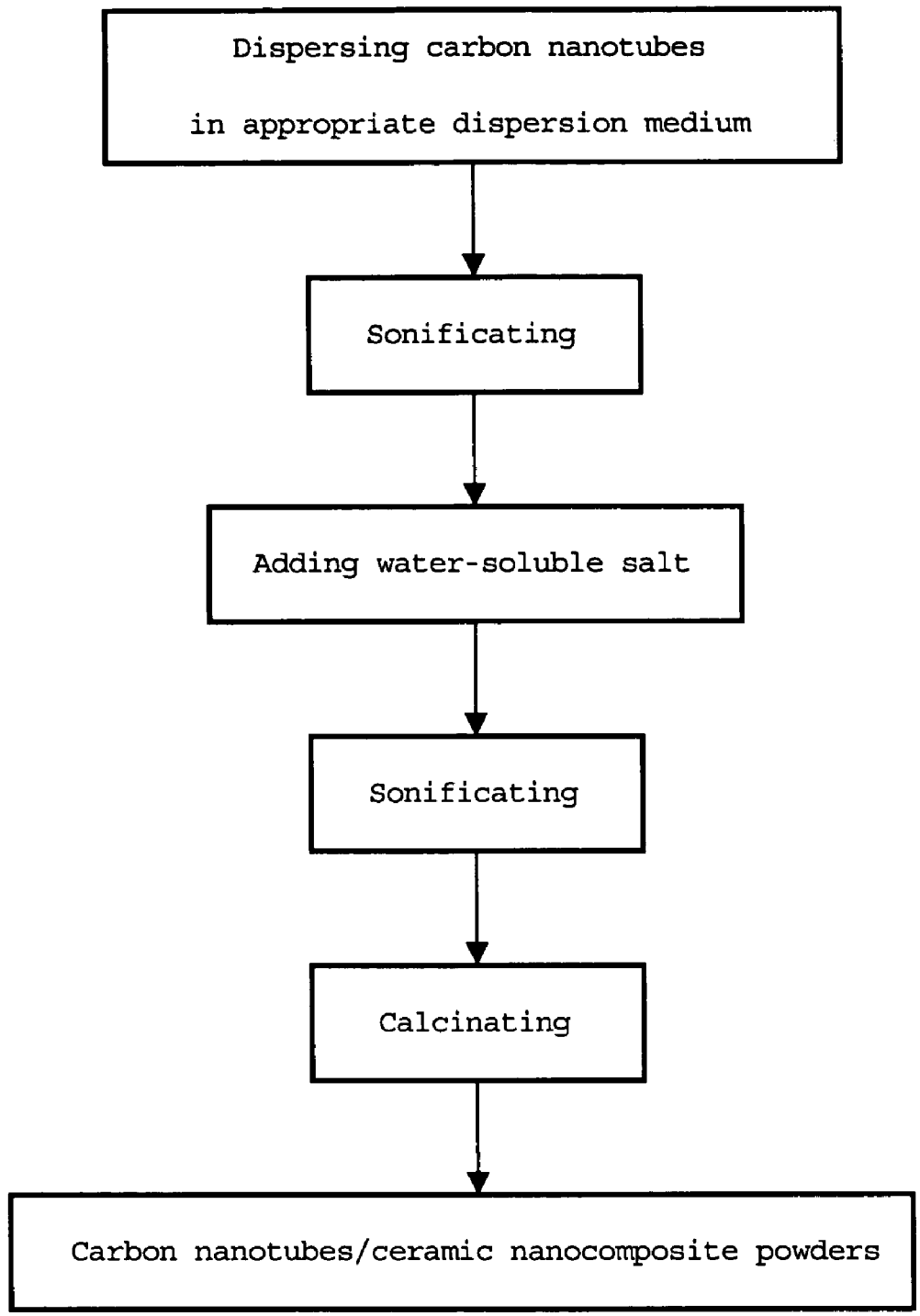
FIG. 3 is a process chart of a method for fabricating ceramic nanocomposite powders according to the present invention.

FIG. 3 is a process chart of the method for fabricating the ceramic nanocomposite powders reinforced with carbon nanotubes of the present invention. The present invention will be described in more detail in the following Examples with reference to FIG. 3. In the Examples, either alumina powders or copper oxide powders were used as the matrix. To prepare the alumina powders and the copper oxide powders, aluminum salt and water-soluble copper salt were used, respectively.

These Examples are given only for the purpose of illustration, and those skilled in the art will appreciate that various modifications of the matrix material are possible. Accordingly, these Examples are not to be construed as limiting the scope of the invention.

Example 1

Carbon nanotube-reinforced alumina nanocomposite powders having a calcination temperature of 400° C. or higher were fabricated. First, 500 mg of multi-walled carbon nanotubes (diameter: about 10-40 nm; length: 5 μm, Nanotech Co., Ltd., Korea) were added to 500 ml of 65% nitric acid as a dispersion solution. The mixture was then subjected to sonication at 50 W and an intensity of 45 kHz for 2 hours using an ultrasonic cleaner (Model 08893-16, Cole-Parmer, Vernon Hills, Ill.) to prepare a dispersion of carbon nanotubes in nitric acid solution. The sonication was carried out to homogeneously disperse the carbon nanotubes and to enable matrix powders to widen the diffusion pathways between the carbon nanotube powders.

In order to attain a volume fraction of carbon nanotubes of 10% (by volume), 1.7 g of aluminum hydroxide ($Al(OH)_3$), as a matrix, was added to the dispersion prepared above. The mixture was then sonicated at 50 W and an intensity of 45 kHz for 2 hours. The sonication was carried out to homogeneously disperse the carbon nanotubes and aluminum hydroxide and induce formation of chemical bonds between carbon nanotubes and matrix at the molecular level.

The sonicated dispersion was heated to about 100° C. to evaporate water and then air-dried at 300° C. The resulting dried powders were then calcinated at a pressure of $10^{-1}$ torr and a temperature of 1,100° C. for 2 hours to fabricate carbon nanotube-reinforced alumina composite powders.

Figure 4:
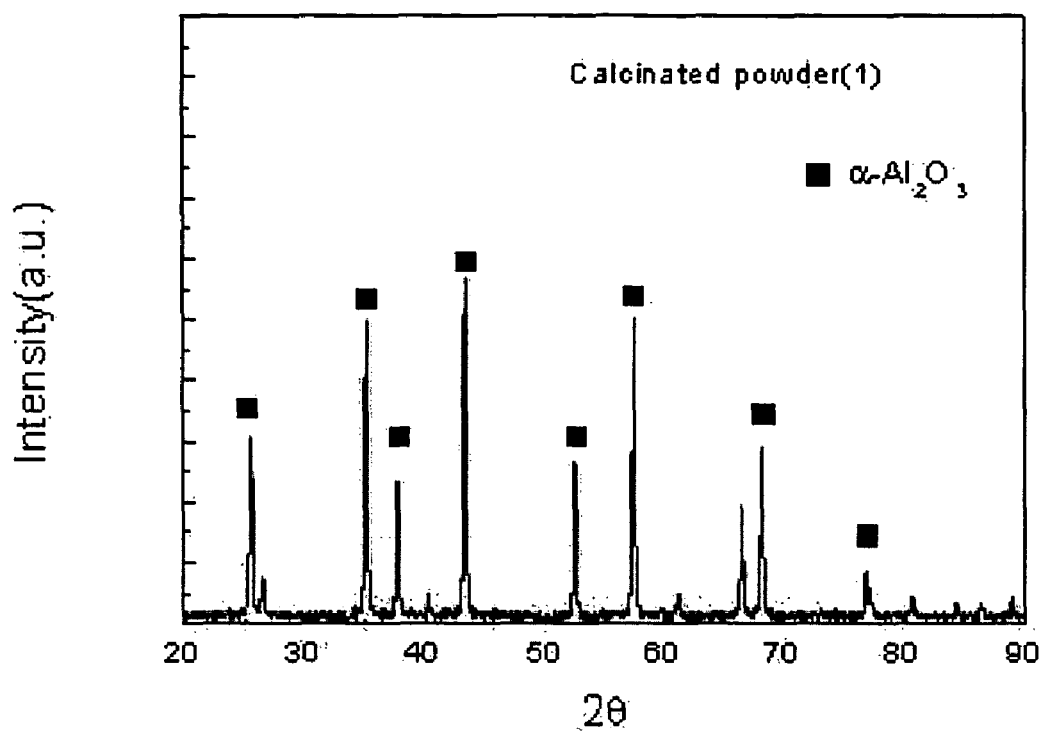
FIG. 4 is an X-ray diffraction (XRD) graph showing carbon nanotube/alumina nanocomposite powders fabricated in accordance with an embodiment of the present invention.

To determine the type and state of the powders fabricated after calcination, X-ray diffraction (XRD) analysis was performed. XRD analysis revealed that the composition of the powders was stable α-alumina (α-$Al_2O_3$) (FIG. 4).

Figure 5A:
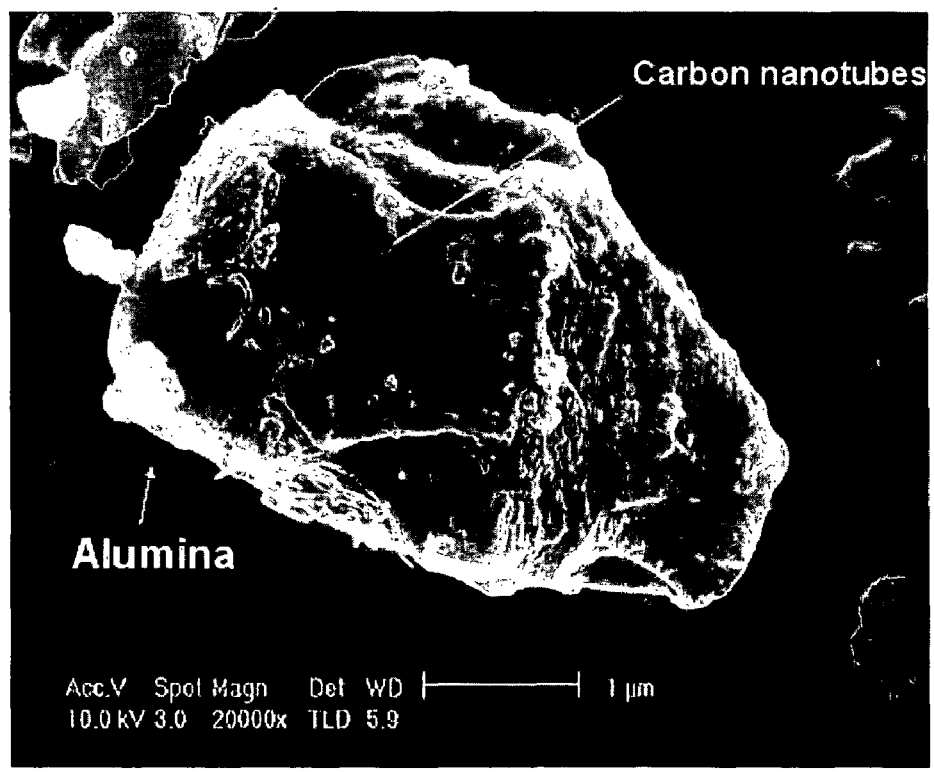
FIGS. 5a and 5b are SEM images of carbon nanotube/alumina nanocomposite powders fabricated in accordance with the present invention.
Figure 5B:
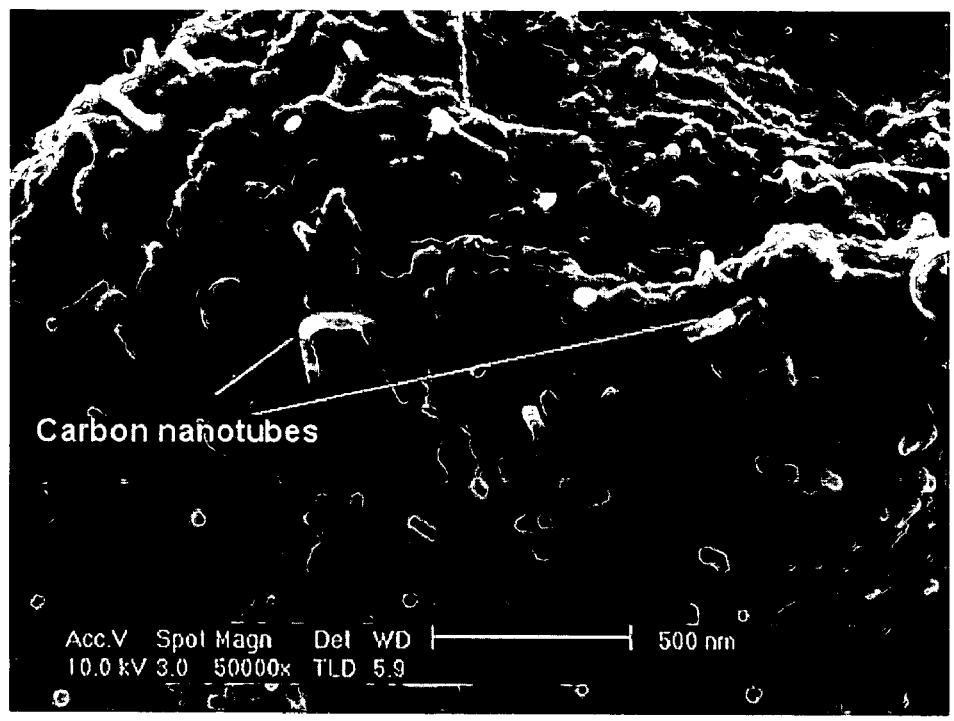

The phase of the powders fabricated after calcination was identified through scanning electron microscope (SEM) images of the carbon nanotube-reinforced alumina composite powders shown in FIGS. 5a and 5b. FIG. 5a shows the phase of the carbon nanotube/alumina composite powders, and FIG. 5b shows the fracture surface of the carbon nanotube/alumina composite powders.

Example 2

Carbon nanotube/copper oxide nanocomposite powders having a calcination temperature of 400° C. or lower were fabricated. First, 20 mg of multi-walled carbon nanotubes (diameter: about 10-40 nm; length: 5 µm, Nanotech Co., Ltd., Korea) were added to 300 ml of ethanol as a dispersion medium. The mixture was then sonicated at 50 W and at an intensity of 45 kHz for 2 hours using an ultrasonic cleaner (Model 08893-16, Cole-Parmer, Vernon Hills, Ill.) to prepare a dispersion of carbon nanotubes in ethanol. The sonication was carried out to homogeneously disperse the carbon nanotubes and to enable copper salt to widen the diffusion pathways between the carbon nanotube powders.

In order to attain a volume fraction of carbon nanotubes of 10% (by volume), 3 g of copper salt ($Cu(CH_3COO)_2$) was added to the dispersion prepared above. The mixture was then sonicated at 50 W and at an intensity of 45 kHz for 2 hours. The sonication was carried out to homogeneously disperse the carbon nanotubes and copper molecules, and induce the formation of chemical bonds between the carbon nanotubes and the copper molecules at the molecular level.

The sonicated dispersion was heated to about 80-100° C. for 8 hours to evaporate water and calcinated in air at 300-350° C. for 4 hours. Under the calcination conditions, unnecessary organic solvents were removed and a sufficient amount of oxygen was provided to fabricate stable carbon nanotube-reinforced copper oxide composite powders.

Figure 6A:
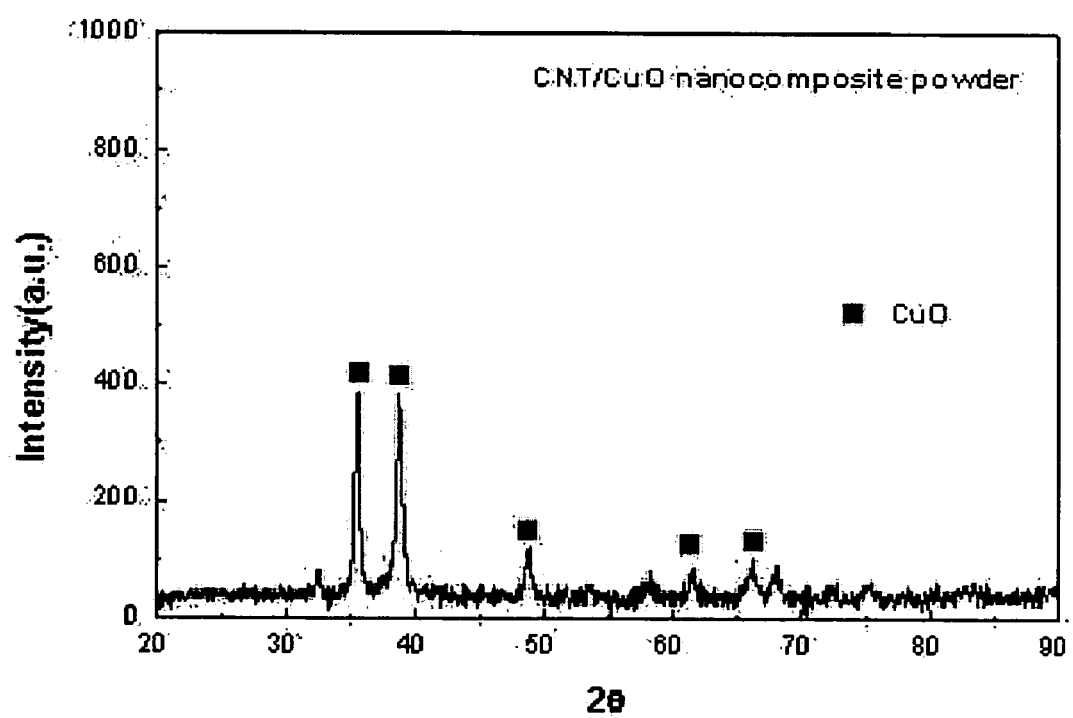
FIGS. 6a and 6b are an XRD graph and SEM image of carbon nanotube/copper oxide nanocomposite powders fabricated in accordance with the present invention, respectively.

To determine the type and phase of the powders fabricated after calcination, an XRD analysis was performed. The XRD analysis revealed that the composition of the powders was stable copper oxide (CuO) (FIG. 6a).

Figure 6B:
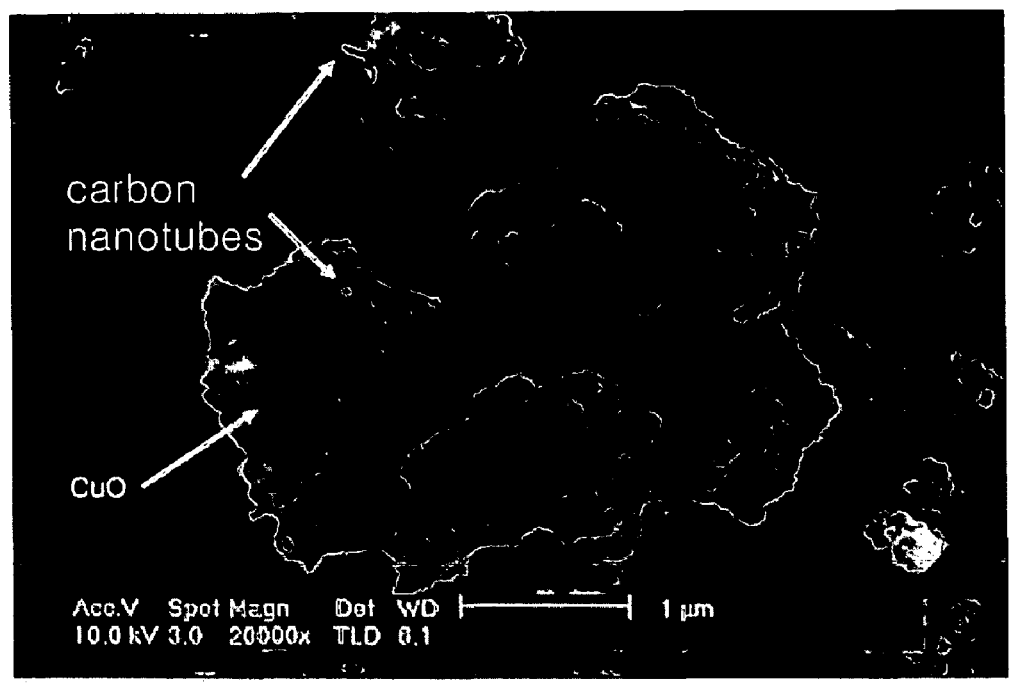

The phase of the powders fabricated after calcination was identified through SEM images of the carbon nanotube-reinforced copper oxide composite powders shown. FIG. 6b shows a representative phase of carbon nanotube/copper oxide nanocomposite powders which have a volume fraction of carbon nanotubes of 10% (by volume).

In the method of the present invention, carbon nanotubes are homogeneously dispersed in the ceramic matrix. Accordingly, agglomeration of carbon nanotubes, a problem of conventional powders and composite materials fabricated using carbon nanotubes, can be solved. In addition, the method of the present invention is suitable for mass production of nanocomposite powders in a simple manner without the need for additional apparatuses.

Conventional studies of carbon nanotubes have been devoted to dispersion, functionalization and orientation of the carbon nanotubes, particularly in the field of electronic devices, whereas the present invention provides a basic technique capable of fabricating ceramic composite materials using carbon nanotubes. Accordingly, the ceramic nanocomposite powders fabricated in accordance with the present invention can be used as high value-added abrasives or wear-resistant coating materials. Furthermore, since high sinterability of ceramic nanocomposite powders leads to fabrication of bulky ceramic nanocomposite materials, the present invention can be used in a broad range of fields such as the aerospace industry, high performance mechanical appliances, the medical industry and the like.

These examples illustrate possible embodiments of the present invention. While the invention has been particularly shown and described with reference to some embodiments thereof, it will be understood by those skilled in the art that they have been presented by way of example only, and not limitation, and various changes in form and details can be made therein without departing from the spirit and scope of the invention. Thus, the breadth and scope of the present invention should not be limited by any of the above-described exemplary embodiments, but should be defined only in accordance with the following claims and their equivalents.

All documents cited herein, including journal articles or abstracts, published or corresponding U.S. or foreign patent applications, issued or foreign patents, or any other documents, are each entirely incorporated by reference herein, including all data, tables, figures, and text presented in the cited documents.

What is claimed is:

1. A method for fabricating ceramic nanocomposite powder, said method comprising:
    (a) dispersing carbon nanotubes in a dispersion medium, wherein the dispersion medium is selected from the group consisting of water, ethanol, nitric acid solution, toluene, N,N-dimethylformamide, dichlorocarbene, and thionyl chloride;
    (b) sonicating the dispersion resulting from (a);
    (c) dispersing a water-soluble salt in the sonicated dispersion resulting from (b), wherein said water-soluble salt, mixed with the carbon nanotubes, consists of metal-based salts capable of being formed into a ceramic matrix post calcination;
    (d) sonicating the dispersion resulting from (c) for 2 to 10 hours, the dispersion consisting of the carbon nanotubes, the water-soluble salt, and the dispersion medium; and
    (e) drying and calcinating the sonicated dispersion resulting from (d); thereby fabricating ceramic nanocomposite powder, wherein said carbon nanotubes are homogeneously dispersed in said ceramic matrix, and wherein chemical bonds are formed between the carbon nanotubes and the ceramic matrix.

2. The method according to claim 1, wherein said ceramic matrix is selected from the group consisting of aluminum oxides, copper oxides, cobalt oxides, nickel oxides, zinc oxides, tungsten oxides and silicon oxides.

3. The method according to claim 1, wherein said drying is carried out at 80-100° C.

4. The method according to claim 3, wherein when said ceramic matrix requires a calcination temperature of 400° C. or lower, said ceramic matrix is further dried at 300-350° C.

5. The method according to claim 1, wherein the calcination is carried out in air at 300-350° C.

6. The method according to claim 1, wherein the calcination is carried out under high vacuum at a temperature of 400-1,700° C.

* * * * *